United States Patent [19]

Hashimoto

[11] Patent Number: 4,935,808
[45] Date of Patent: Jun. 19, 1990

[54] LOW-NOISE IMAGE PICKUP DEVICE HAVING READOUT TRANSFER PATHS FOR DIVIDED IMAGE INFORMATION

[75] Inventor: Seiji Hashimoto, Yokohama, Japan

[73] Assignee: Canon Kabushiki Kaisha, Tokyo, Japan

[21] Appl. No.: 246,025

[22] Filed: Sep. 14, 1988

Related U.S. Application Data

[63] Continuation of Ser. No. 102,265, Sep. 25, 1987, abandoned, which is a continuation of Ser. No. 556,991, Dec. 1, 1983, abandoned.

[30] Foreign Application Priority Data

| Dec. 7, 1982 | [JP] | Japan | 57-214412 |
| Mar. 1, 1983 | [JP] | Japan | 58-33978 |
| Mar. 1, 1983 | [JP] | Japan | 58-33979 |
| Mar. 1, 1983 | [JP] | Japan | 58-33980 |

[51] Int. Cl.$^5$ ............................................. H04N 9/077
[52] U.S. Cl. ....................................... 358/48; 358/44
[58] Field of Search ................ 358/26, 30, 41, 44, 358/213, 48, 50; 357/24, 24 LR; 365/183, 219; 377/61, 62

[56] References Cited

U.S. PATENT DOCUMENTS

| 4,001,878 | 1/1977 | Weimer | 358/48 |
| 4,277,800 | 7/1981 | Nakagaki et al. | 358/44 |
| 4,338,625 | 7/1982 | Yamanaka | 358/29 C |
| 4,438,457 | 3/1984 | Tandon et al. | 358/213.26 |
| 4,473,839 | 9/1984 | Noda | 358/41 |
| 4,513,313 | 4/1985 | Kinoshita et al. | 358/44 |
| 4,527,190 | 7/1985 | Onga et al. | 358/30 |
| 4,751,567 | 6/1988 | Hashimoto | 358/44 |
| 4,814,861 | 3/1989 | Hieda | 358/29 C |

FOREIGN PATENT DOCUMENTS

| 3048538 | 9/1981 | Fed. Rep. of Germany . | |
| 55429 | 5/1977 | Japan | 358/50 |
| 139428 | 12/1978 | Japan | 358/50 |
| 32021 | 3/1979 | Japan | 358/48 |
| 55-51395 | 12/1980 | Japan . | |
| 56-120281 | 9/1981 | Japan . | |
| 158577 | 12/1981 | Japan | 358/48 |

Primary Examiner—James J. Groody
Assistant Examiner—Randall S. Svihla
Attorney, Agent, or Firm—Fitzpatrick, Cella, Harper & Scinto

[57] ABSTRACT

An image pickup device has an image sensor which converts an optical image into electric information, and readout transfer paths to divide the information of one horizontal line of the sensor and to read it out, e.g., as dot signals. A control device distributes the above-mentioned information of one line with a predetermined period for each transfer path. An adjustment device adjusts the levels of the outputs from each of the readout transfer paths. The outputs of each of the color signals so adjusted are sequentially switched over and are sequence-processed. A suppression circuit provided in association with the sequencing circuitry suppresses the levels of each of the adjusted color signals to make those signals non-linear. Color filters may be provided, to produce color signals, and a luminance signal may be formed from the color signals. Delay circuits may be provided to ensure desired phase relations among the read-out signals.

47 Claims, 9 Drawing Sheets

LOW-NOISE IMAGE PICKUP DEVICE HAVING READOUT TRANSFER PATHS FOR DIVIDED IMAGE INFORMATION

This application is a continuation of application Ser. No. 102,265 filed Sept. 25, 1987, now abandoned, which is a continuation of application Ser. No. 556,991 filed on Dec. 1, 1983, now abandoned.

BACKGROUND OF THE INVENTION

1. Field of the Invention

The present invention relates to a solid state image pickup device.

2. Description of the Prior Art

In this type of device, conventionally, there are usually used solid state image pickup devices using X-Y addresses, called a MOS type, CCDs of the interline type, CCDs of the frame transfer type, or the like.

The frame transfer type CCDs among them have a very simple structure as compared with that of the devices of the MOS or interline type since it is not necessary to provide a vertical transfer register in an image pickup part. Therefore, it is possible to integrate a large number of horizontal picture elements corresponding to the horizontal direction of the TV screen. FIG. 1 shows such a conventional frame transfer type CCD which comprises an image sensing part 1 to perform the photoelectric conversion, a memory part 2 as a storage section to temporarily store the charges from the image sensing part, a horizontal shift register 3 to transfer the stored charges from the memory part in accordance with the TV synchronization, and an output amplifier 4 to read out the charges as a voltage signal. A color separation filter necessary for production of color signals is adhered or on-chipped on such a CCD. FIG. 2 shows an example of such a filter. There will now be described hereinbelow a conventional frame transfer type CCD using an R-G-B stripe method, which is said to provide excellent color reproductivity.

In the case where a filter according to the stripe method is used and the number of picture elements in the horizontal direction is about 580 elements, the horizontal transfer frequency is equal to 10.7 MHz. When CCDs equal in numer to these elements are used, in many cases, a luminance signal is ordinarily obtained by allowing the output signal of the CCD to pass through a high-band low-frequency filter (about 3 MHz) as it is, while color signals are derived by performing color signal separation with respect to the repetitive frequency 3.58 MHz of the R-G-B signals by means of respective sample and hold circuits.

In this case, there is no problem with respect to the color signals although a frequency band width of 500 kHz is needed for the NTSC system, since the sampling frequency is 3.58 MHz and the components of the signal band up to its Nyquist frequency can be reproduced in the present embodiment. However, for the luminance signal, although no problem will be caused if the color of an object image is nearly achromatic, in case of an object image having high color saturation, the sampling frequency becomes 3.58 MHz (Nyquist frequency: 1.8 MHz), so that a large amount of fold distortion (aliasing noise) could occur and this causes the picture quality to deteriorate remarkably. To solve such a drawback, it is necessary to set the number of horizontal picture elements at about 770 and to drive the CCD at a frequency of 14 MHz. With a CCD which can cope with 14 MHz, even in the case of the special object image mentioned above, the sampling frequency becomes about 4.77 MHz (Nyquist frequency: 2.4 MHz), thereby enabling the fold distortion (aliasing noise) to be greatly reduced; therefore, no problem will be caused in ordinary image receiving apparatuses.

However, in the case of a CCD to be driven at 14 MHz, the problems which will be mentioned below occur with the horizontal shift register, output amplifier, clock IC, and color separation sample and hold circuit.

First, in order to separate the color signals of R, G and B from the output signal of the CCD, the period of the portion corresponding to the valid signal component of the 14-MHz signal must be long to a certain degree. However, in case of the drive pulse having a duty ratio of 50%, the signal component is $$\left(\frac{1}{2 \times 14.318 \text{ MHz}}\right) = 35 \text{ ns by calculation,}$$

but assuming that the leading and trailing times due to the elements of the drive circuit total about 10 ns, the remaining portion would have been actually about 25 ns. Furthermore, if the leading and trailing edges of the clock are extremely steep, the period of the valid signal portion will have been further shortened since the dark current increases due to occurrence of heat in the shift register. In addition, if the frequency characteristic of the output amplifier is also considered, the valid signal period will have been further shortened. As described above, in the CCD to be driven at 14 MHz, the period of the signal component is thus fairly short, and a variation of sampling pulses due to a variation of elements in the clock generating section or due to a temperature variation is also added; therefore there occurs the drawback that the signal separation is difficult.

There is also the drawback that it is at present fairly difficult to integrate a CCD of 770 elements as a horizontal shift register of an image sensor of the size of, e.g. ½ inch.

The incident light upon the image pickup device through a filter like that shown in FIG. 2 and through the optical filter is spatially sampled by the above-mentioned color stripe filter and image pickup device. However, in this case, the spatial frequency component of the incident light corresponding to not lower than ½ of the spatial sampling frequency to be determined on the basis of the number of picture elements of the image pickup device and of the pitch of the color stripe filter becomes a cause of fold distortion as described previously. This point will be described in detail hereinbelow with reference to FIGS. 3A, 3B and 3C, in which each axis of abscissa denotes a frequency and each axis of ordinate represents a signal level.

Although the incident light samples on the image pickup device is read out as image pickup signals from the image pickup device due to the photoelectric conversion action or the like, when attention is paid to only the R signal (or to only the G or B signal) among these image pickup signals, its repetitive frequency is ⅓ of the readout frequency. Assuming that this repetitive frequency is $f_c$, the base band component and side band component of the incident light due to the sampling are as shown in FIG. 3A, wherein the hatched section is called a fold distortion component. When this signal is allowed to pass through a low-pass filter having such a characteristic as shown in FIG. 3B, this fold distortion component remains by being mixed with the base band component, so that this distortion component causes the picture quality to deteriorate remarkably on the display. One of the methods of reducing such a fold distortion is set forth in Japanese Kokai 56-120281. For example, as shown in FIG. 3C, when an achromatic color object image is pictured, if the color separation filter is designed in such a manner that the levels of the dot-sequential signals to be output from the image pickup device are 1:1:1, the side band components are set off, thereby enabling the fold distortion to be reduced.

According to this method, it is possible to reduce the fold distortion with respect to at least the achromatic color screen.

It is of course impossible to obtain such an effect with respect to a screen having high color saturation; however, this point may be neglected since human luminous efficiency, or the luminous factor concerning color, on the high-band side is lower.

However, in the above-mentioned case, a variation of color temperature of the photographic light source due to differences in objects and locations of the photographing causes the levels of dot-sequential signals to be unbalanced, and this results in the occurrence of fold distortion. FIG. 4 shows spectral energies at the color temperatures of, e.g. 3200° K. and 6000° K. FIG. 5 shows a drawback in the case where the color separation filter was designed so that the dot-sequential output signal level becomes constant at, e.g. 3200° K. If the filter is set in such a manner that the levels of R, G and B become 1:1:1 at the color temperature of 3200° K., as shown in FIG. 5, the level on the long wavelength side, namely on the R side, will be weak at 6000° K., while the level on the B side will be strong, so that the vector of the side band will have been deflected on the side of cyan (Cy) as shown in FIG. 5, causing fold distortion to occur.

Furthermore, since the image pickup device generally has a high sensitivity for infrared rays and has a difference with luminous efficiency, an infrared-ray cut filter is provided on the light incident optical path of the image pickup device in order to prevent such difference. However, a variations in thickness these infrared-ray cut filters which occur in the manufacturing process cause a variation in spectral sensitivity characteristic of this filter, which may result in a fluctuation in the R signal level.

As a method of eliminating such a drawback, the following method is known.

Namely, a method is known where a mechanical color temperature correction or compensation filter is used. According to this method, for example, color temperature correction filters for use in daylight, fluorescent lamp light and tungsten light are mainly prepared in general and the above-mentioned correction filters are changed over in accordance with the location where the photograph will be taken. A drawback of this method is that several kinds of correction filters are needed and that it is impossible to completely prevent the occurrence of fold distortion since the levels of the dot-sequential signals are roughly matched.

Moreover, in conventional image pickup devices, there is the drawback that noise is so large that the S/N ratio of the picture image is bad. For example, in a television camera using an image pickup tube of the three-electrode type that is disclosed in Japanese 55-51395, a high-band luminance signal is obtained by adding the R, G and B signals. That is, the outut signals R, G and B of the three electrodes becomes R, G and B as shown in FIG. 6 by the scanning of the electron beam, and the three color signals are synthesized to obtain a luminance signal Y. In this case, since the noise caused in the image pickup tube evenly occurs in both the signal component region and the invalid component region, the noise of the synthesized luminance signal is increased by about $\sqrt{3}$ times, so that there is the drawback that the S/N ratio becomes worse by the amount corresponding to that increased noise.

Furthermore, in such an image pickup device, there is a tendency to lower the power voltage of the signal processor for the purposes of miniaturization and low electric power consumption, and power supply of 5 V is at present generally used. In order to generate a video signal with excellent picture quality using such a low power source, it is necessary to properly process the signal level and to equivalently enlarge the dynamic range of the signal processor. In general, as a method of enlarging the dynamic range in the video signal processing, a circuit to nonlinearly suppress the high-luminance signal, called a KNEE circuit, is known. However, if this KNEE circuit is applied as it is to the signal read out from the image pickup device, there are the drawbacks that fold distortion increases in the luminance signal, while an error in white balance occurs in the color signals, causing the picture quality to deteriorate remarkably.

FIGS. 7A and 7B show graphs to explain the above-mentioned drawbacks in conventional technologies.

FIG. 7A will be now described. In many cases, the output levels of each color signal of the image pickup device differ in dependence upon the color temperature of the light source used for photographing as described previously. It is assumed here that an achromatic color object is photographed as an example for purposes of description and that the levels of the R and G signals at this time are equal and that the level of the B signal is slightly lower than the levels of R and G. Namely, it is assumed that each signal level represents the characteristics of R, G and B as indicated by the solid lines in FIG. 7A to an increase in quantity of light. At this time when the saturation signal level is represented by a symbol of $V_{sat}$, the color signals R and G will have been saturated in the quantity of light indicated at point a, an the B signal at point b, since the saturation levels of R, G and B are generally identical. When the KNEE characteristic is added to each of the R, G and B signals at a predetermined signal level $V_{KNEE}$ in order to widen the dynamic range of the circuit in this state, signals R, G and B become the signals R', G' and B' as shown by the broken lines. Next, when the white balance, i.e. the level adjustment of these R', G' and B' signals, is performed, the levels of the R' and G' signals do not coincide with the level of the $\alpha B'$ signal (where $\alpha$ is a coefficient for level adjustment) in the range over the $V_{KNEE}$ level as shown in FIG. 7B. ($V_{wc}$ denotes the white clipping level and the signal exceeding this level is cut off in the circuit.)

Consequently, in the signal levels in the hatched section of FIG. 7B, the luminance signal level is not matched, causing fold distortion to occur. In addition, there is the drawback that the white balance of the color signals cannot be obtained.

SUMMARY OF THE INVENTION

It is a first object of the present invention to provide an image pickup device which can eliminate such various drawbacks in conventional technologies as described hereinbefore.

A second object of the present invention is to provide an image pickup device which can simplify the constitution of, or omit, a sample and hold circuit for color separation.

A third object of the present invention is to provide an image pickup device which can accurately perform the color separation of an image sensor having a number of elements in the horizontal direction.

A fourth object of the present invention is to provide an image pickup device which can eliminate the drawbacks as mentioned before and which is equipped with a signal processor which can easily adjust the dot-sequential signal level.

A fifth object of the present invention is to provide an image pickup device which can eliminate the drawbacks mentioned before and can drive an image pickup device with the addition of little noise.

According to the present invention, an image pickup device comprises a storage part to store signals; a plurality of readout parts to read out the signals in the storage part; level adjustment means for mutually adjusting the levels of the signals to be read out by the plurality of readout parts; and sequence means for performing the sequence processing to the signals from the readout parts whose levels were mutually adjusted by the level adjustment means and for outputting the sequential signal.

Other features of the invention will become more fully apparent from the following detailed description.

DETAILED DESCRIPTION OF THE PREFERRED EMBODIMENTS

Figure 8A:
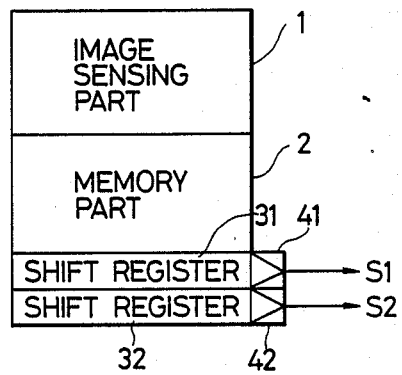
FIG. 8A is a diagram showing a constitution of a CCD image pickup device which is suitable for use in the present invention.

The present invention will be described hereinbelow with respect to an embodiment in which, in order to eliminate the previously-described drawbacks, a CCD having two horizontal shift registers as readout transfer paths such as shown in FIG. 8A is used in place of a conventional CCD having one horizontal shift register, and the horizontal transfer frequency is lowered to $\frac{1}{2}$, thereby fundamentally solving the previously-mentioned problems. That is to say, the horizontal transfer frequency is reduced by one half by transferring the charges of the picture elements in the horizontal direction to the two horizontal shift registers with a period of every one picture element by a clock circuit 46 shown in FIG. 8C. In FIG. 8A, a reference numeral 1 denotes the image sensing and 2 indicates the memory part as a storage section.

Figure 1:
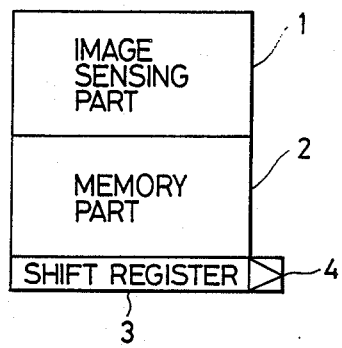
FIG. 1 is a diagram showing a constitution of a frame transfer type CCD.
Figure 2:
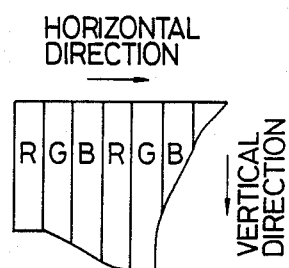
FIG. 2 is a diagram showing an example of a repetitive color filter of R, G and B.
Figure 3A:
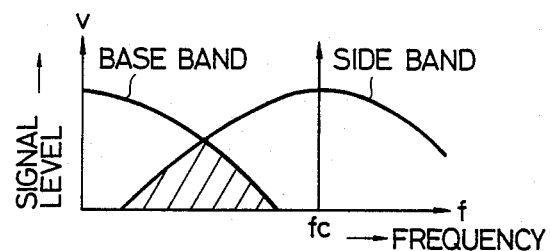
FIGS. 3A, 3B and 3C are graphs to explain fold distortions.
Figure 3B:
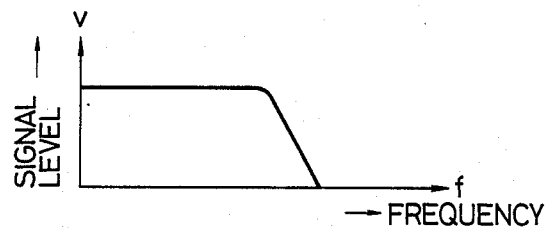
Figure 3C:
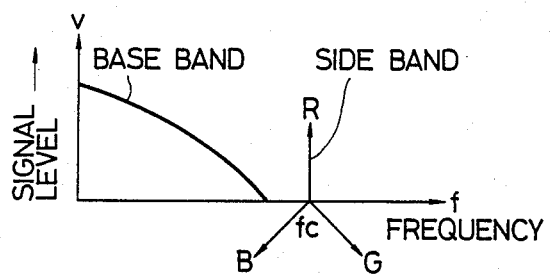
Figure 4:
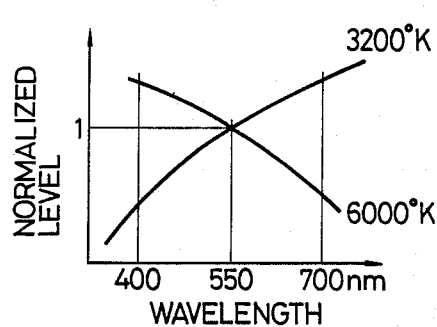
FIG. 4 is a graph showing spectral energies due to differences in photographing light sources.
Figure 8B:
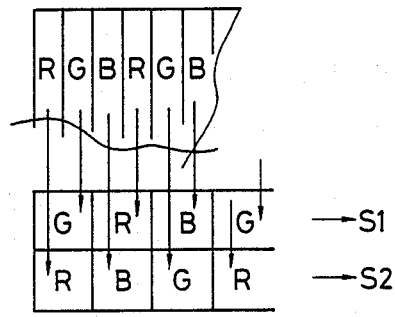
FIG. 8B is a diagram to describe a method of distributing horizontal line signals.

In this case, although the frame transfer type CCD is described in this embodiment, the above-mentioned constitution can be of course substantially similarly applied even to an interline transfer type CCD. In the case where the color filter shown in FIG. 2 is adhered to the CCD of FIG. 8A with such a constitution and this device is driven by the clock circuit 46 of FIG. 8C, which will be described later, the outputs of the R, G and B signals having different phases are obtained as shown in FIG. 8B from outputs S1 and S2 of first and second shift registers 31 and 32 as readout parts. The clock circuit 46 drives the CCD and also serves as control means for controlling the distribution of the charges to the first and second registers.

Figure 8C:
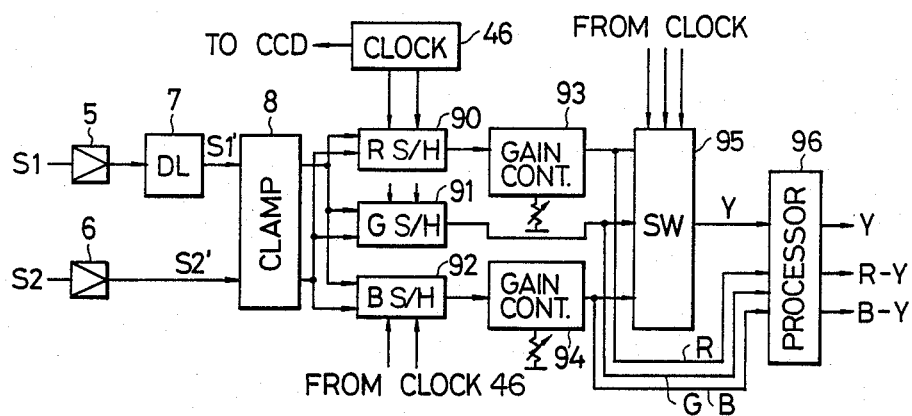
FIG. 8C is a circuit diagram showing a signal processor as a first embodiment according to the present invention.
Figure 8D:
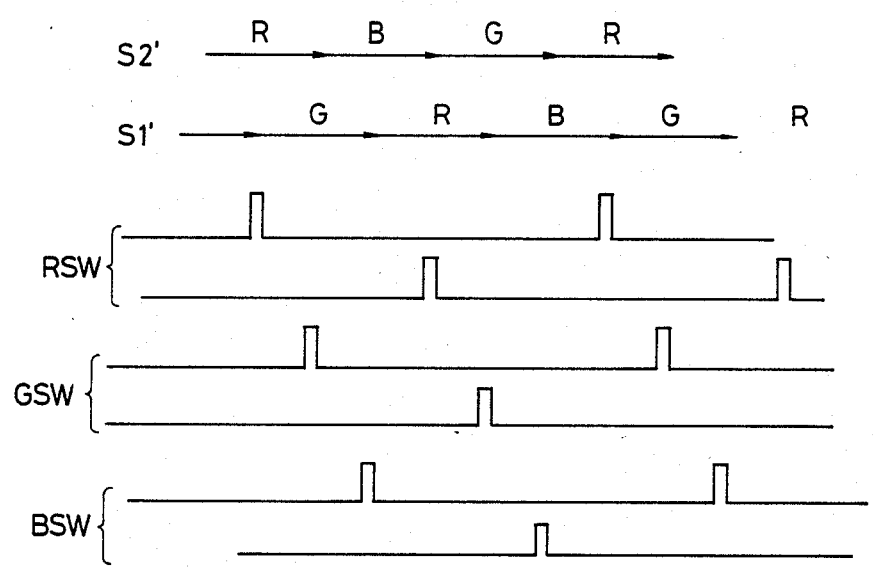
FIG. 8D shows timing charts of the clock signals.

FIG. 8C is a circuit diagram showing a signal process to produce luminance signals Y, (R-Y) and (B-Y) from the outputs S1 and S2 of these first and second reigsters. There is now considered the case where each of the registers 31 and 32 is driven with the same phase. After the outputs S1 and S2 of the registers are amplified by amplifiers 5 and 6, respectively, the output of the amplifier 5 is delayed by only a predetermined amount of phase by means of a delay circuit 7, so that it is returned to the spatial sampling sequence as shown in FIG. 8D.

The amount of delay provided by the delay circuit 7 is set into $\frac{1}{2}$ of the clock cycles of the registers 31 and 32.

After the outputs of the delay circuit 7 and amplifier 6 have been clamped by a clamping circuit 8, they are input to an R (red) component sample and hold circuit 90, a G (green) component sample and hold circuit 91 and a B (blue) component sample and hold circuit 92, respectively. Then, they are sampled and held by sampling pulses RSW, GSW and BSW as shown in FIG. 8D, respectively.

The sampling pulses RSW, GSW and BSW are output from the clock circuit 46.

The timings of the dot-sequential color signals are allowed to coincide with each other by these sample and hold circuits 90-92, and the levels of the outputs of the circuits 90 and 92 are further adjusted so as to be equal to the level of the G signal by gain control circuits 93 and 94 each serving as level adjustment means. Thereafter they are subjected to dot-sequence processing again in a switching circuit 95 as sequence means, thereby synthesizing a Y signal. This processing is performed to derive the Y signal without losing the high-frequency component.

In addition, the signals R, G and B (after level adjustment, in the case of the R and B signals) are input to a processor 96 together with the above-mentioned Y signal, where proper corrections are executed.

With such a constitution as described above, the following effects can be obtained.

First, the constitutions of the sample and hold circuits for color separation can be simplified.

It is possible to prevent the deterioration of the S/N ratio while maintaining to the high-speed readout operations of the horizontal shift registers, and to diminish inaccuracy when separating the color signals from the dot-sequential signal.

The drive frequency of the horizontal shift register can be substantially lowered.

Since only two horizontal shift registers are used, the constitution is more simplified as compared with the case where the horizontal registers are provided for each color.

The constitution of the processor for the outputs of the image pickup devices is simplified by permitting the repetitive pattern of the color filter to coincide with the distribution cycle of the horizontal line signals to both shift registers; moreover, it is possible to realize excellent color reproductivity and to obtain picture quality with high resolution and high sensitivity.

Figure 9:
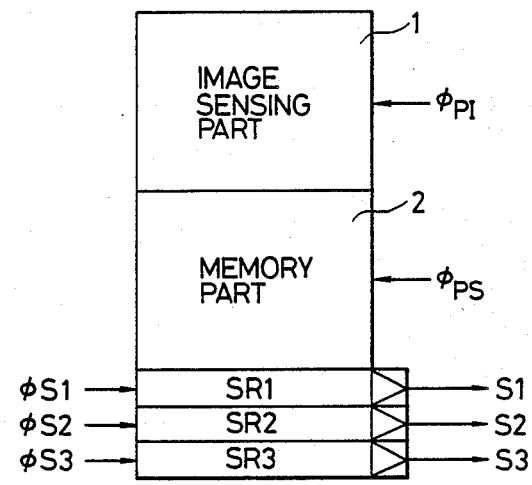
FIG. 9 is a schematic diagram showing a constitution of a second embodiment of the CCD which is suitable for use in a second embodiment according to the present invention.

Referring now to FIG. 9 which shows a second embodiment of the present invention, an example of the image pickup device using the frame transfer type CCD will be described.

The stripe filter shown in FIG. 2 is provided on the frame transfer type CCD of FIG. 9 and the information charges which have been photoelectric converted in the image sensing part 1 in response to each color filter are transferred at high speed to the memory part 2 as a storage section by drive pulses $\phi_{PI}$ and $\phi_{PS}$ in the vertical flyback time of the TV synchronization. Then, for the information charges stored in the memory part 2, the information corresponding to each stripe filter is distributed and transferred to horizontal shift registers SR1, SR2 and SR3 as readout parts with respect to every vertical transfer of one horizontal line.

Figure 10:
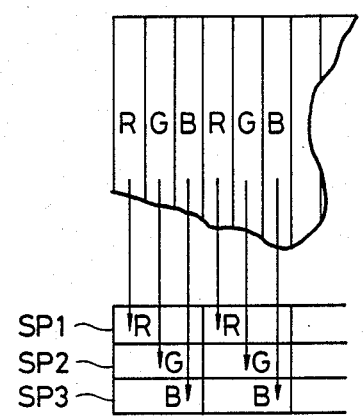
FIG. 10 is a diagram to explain a method of transferring each color signal to the horizontal shift registers.

In other words, as shown in FIG. 10, in this embodiment, the information of one horizontal line of the memory part 2 is distributed to the shift registers SR1-SR3, respectively, for the information for each color and the R, G and B signals are output from the horizontal shift registers SR1, SR2 and SR3, respectively. Thus, the registers SR1, SR2 and SR3 constitute separation means for separating the color signals.

Figure 11:
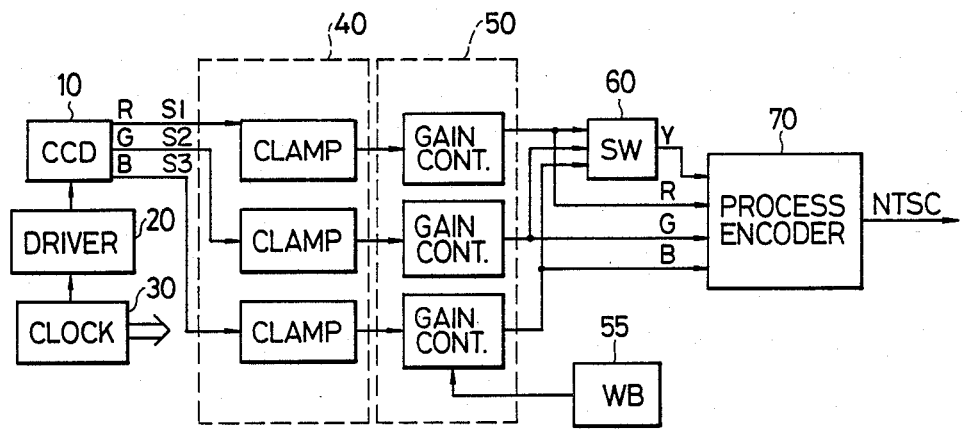
FIG. 11 is a diagram showing a first embodiment of an image pickup device according to the present invention.

FIG. 11 is a circuit block diagram showing a signal processor of the signals read out from the above-mentioned CCD. A filter, for example, as shown in FIG. 2 is adhered as described previously on the surface of an image pickup device 10 (CCD in this embodiment) to be driven by a clock IC 30 as control means and a driver 20, and R, G and B signals corresponding to the color separation filter are individually obtained as its output signals S1-S3. These signals are reproduced as DC signals by clamping circuits 40 and are introduced to gain controllers 50 (which serve as level adjustment means) at the next stage, where the levels of the R, G and B signals are adjusted to be identical by the level adjusting signals. It is preferable to use, as the clamping circuits, feedback clamping circuits for allowing the DC potentials of the input signals to a switching circuit 60 to feed back to the clampers. These gain controls enable the fold distortions when synthesizing the luminance signal to be minimized. The output signals of these gain controllers 50 then pass through the switching circuit 60 as sequence means at the next stage for producing the luminance signal according to the present invention, and thereafter they are introduced to a process encoder circuit 70 in which circuits to perform the signal processings such as gamma correction or white clipping or the like and a circuit to convert into the NTSC signal are integrated.

Figure 7A:
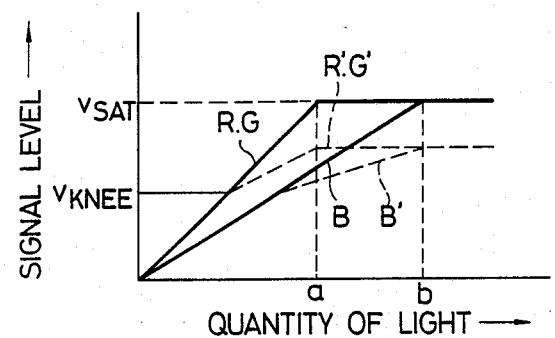
FIGS. 7A and 7B are graphs to explain problems in the case where the KNEE characteristic is added according to a conventional method.
Figure 12:
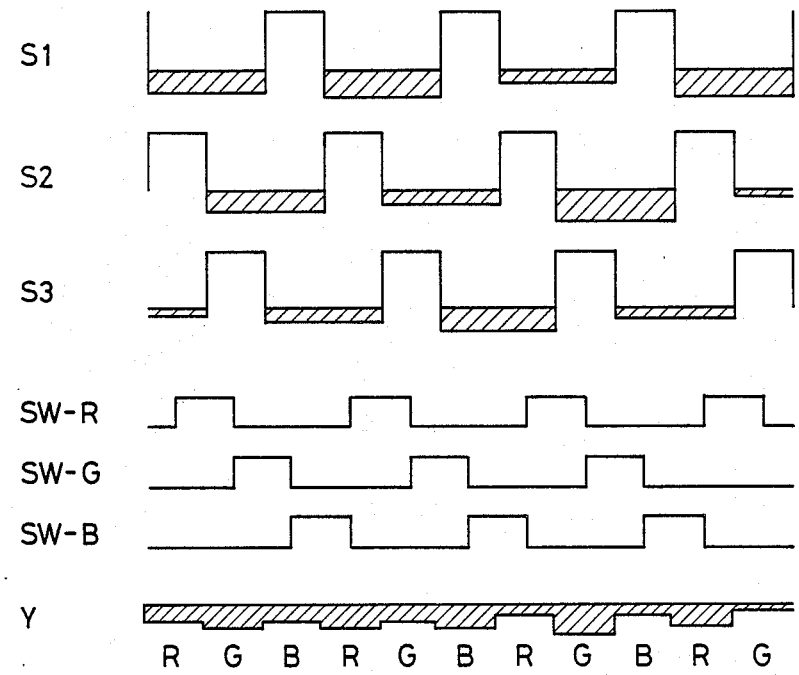
FIG. 12 is a diagram to explain a method of synthesizing a luminance signal by the device shown in FIG. 11.

The operation of the switching circuit 60 will now be described with reference to FIG. 12. S1, S2 and S3 shown in FIG. 12 represent the output signals of the CCD of FIG. 7. In this example, it is assumed that the drive pulses of the horizontal shift registers are three-phase drive pulses whose phases are shifted from each other such as signal waveforms shown in FIG. 12.

When these signals S1, S2 and S3 are extracted using the switching pulses of control signals SW-R, SW-G and SW-B of the switching circuit and these extracted signals are added, the luminance signal Y as shown in FIG. 12 is obtained. Namely, the same signal Y as the spatial sampling of the color separation filter is obtained, so that the resolution is greatly improved. In this way, by extracting only the necessary portions as the luminance signal by the switching, and adding them to produce the luminance signal, the noise from the different signals is not added and, accordingly, the S/N ratio will not deteriorate.

A reference numeral 55 of FIG. 11 denotes a white balance circuit AWB, for which any circuits which can attain the purpose of allowing the levels of the R, G and B signals of the luminance signal to substantially coincide with each other may be used. With such a constitution, when a complementary color filter is used as the color filter, it is possible to separately consider the circuit as the luminance system and the color system, resulting in a simple circuit.

Figure 5:
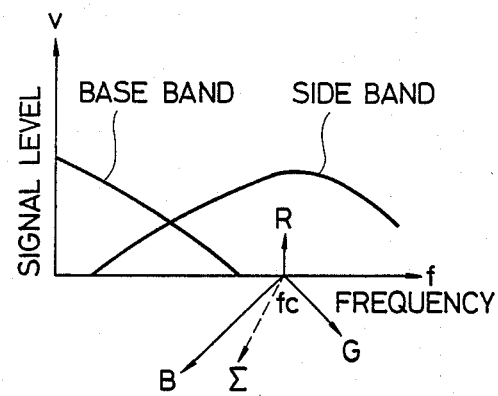
FIG. 5 is a graph to describe the fold distortions due to the unbalanced levels of dot-sequential signals.
Figure 6:
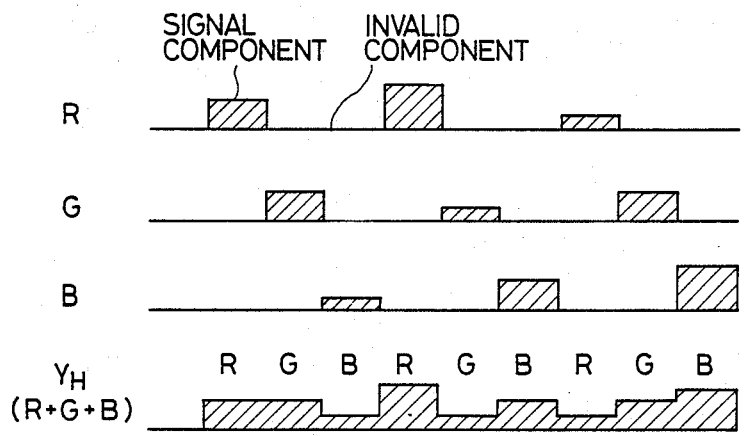
FIG. 6 is a diagram to describe a method of synthesizing a luminance signal according to a conventional method.
Figure 13:
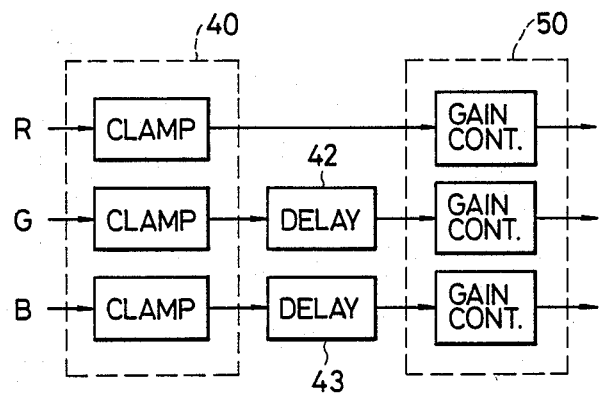
FIG. 13 is a diagram showing a second embodiment of the image pickup device according to the present invention.

According to another embodiment, shown in FIG. 13, the horizontal shift registers of the CCD of FIG. 5 are driven by pulses with the same phase.

In this case, when synthesizing the luminance signal by performing the sequence processing by way of switching, in order to allow the R, G and B signals to coincide with the spatial samplings of the color separation filter, the G and B signals, for example, are delayed by delay circuits 42 and 43 with respect to the R signal. As the delay circuits, ordinary delay lines or sample and hold circuits may be used. As described above, if the driving methods are different with respect to each horizontal shift register, circuit means for returning to the former spatial sampling state will be necessary. This circuit means may be arranged in any position before the stage of the means for synthesizing the luminance signal.

Figure 7B:
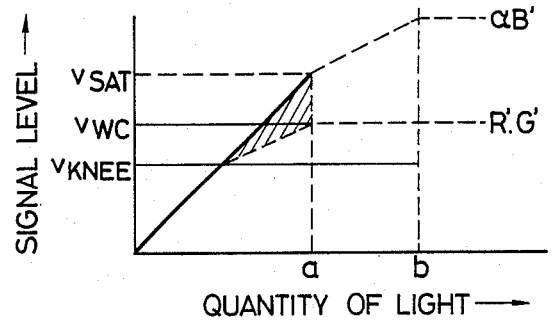
Figure 14:
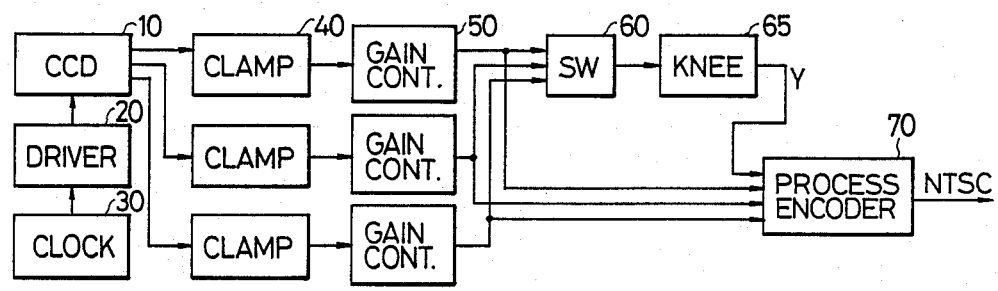
FIGS. 14 and 15 are diagrams showing other embodiments according to the present invention, in which a KNEE circuit is inserted, respectively.
Figure 15:
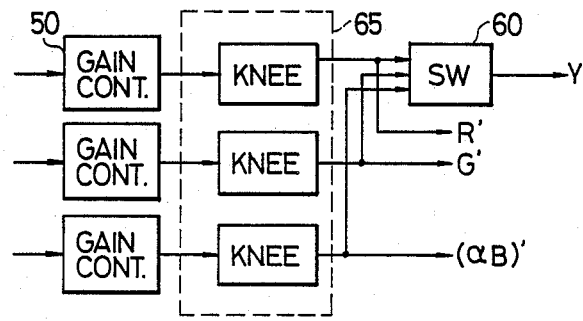

Referring now to FIG. 14, there is shown a diagram of an embodiment using a KNEE circuit as nonlinear suppression means for enlarging the dynamic range of the circuit. If a KNEE circuit 65 is inserted after causing the levels of the R, G and B signals to coincide as in this embodiment, as shown in FIG. 7B, since the signal levels of R', G' and $\alpha$B' are identical in the interval of the signal levels lower than the white clipping level $V_{Knee}$, i.e. of the signal level to be used, no inconvenience will be caused in the luminance signal and color signals. The embodiment of FIG. 14 shows an example in which the KNEE circuit 65 is inserted after the switching circuit 60; on the other hand, FIG. 15 is a diagram showing an example in which the KNEE circuits 65 are inserted after the gain controllers 50. The constitution of the example shown in FIG. 14 is simpler than the case shown in FIG. 15 since the former case uses only one KNEE circuit.

As described above, in this embodiment, after matching the levels of the outputs signals of the image pickup device, the luminance signal is synthesized by performing the sequence processing to the signal components by means of the switching operation, so that the following effects are derived.

First, the constitution is simplified since it is unnecessary to use a color temperature correction filter.

Secondly, the level matching of each color signal to produce the luminance signal enables the fold distortion to be reduced remarkably, thereby obtaining a high-band video signal.

Thirdly, the luminance signal is synthesized by switching only the valid components of each color signal and by performing dot-sequence processing on them; therefore, the S/N ratio is improved.

Furthermore, since the KNEE characteristic is added after the level matching of each color signal, a video signal with a wide dynamic range and without a false signal is obtained.

In addition, although the present embodiment has been described using the solid state image pickup device, this may be a type of image pickup tube and it may be possible to constitute the device by other methods using a plurality of outputs instead of the outputting method of using the three horizontal shift registers.

Figure 16:
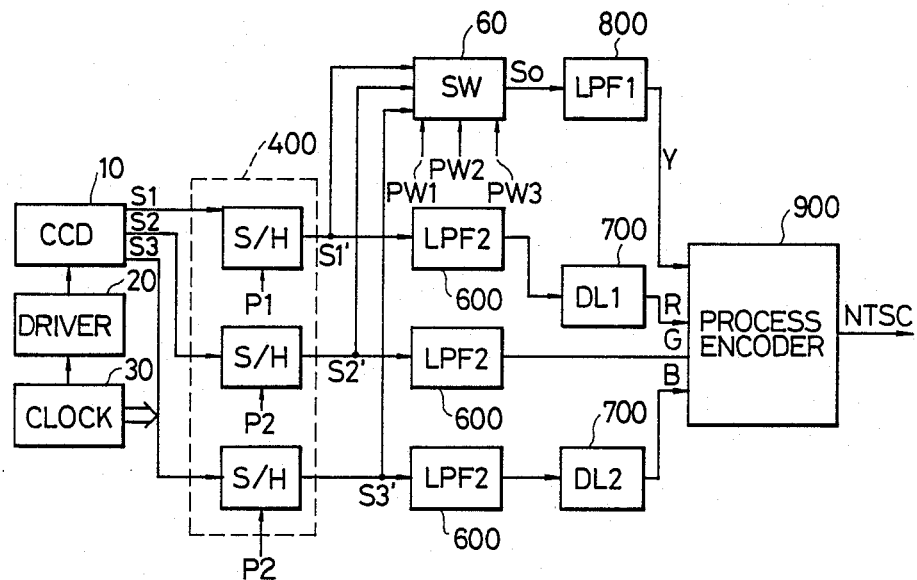
FIG. 16 is a diagram showing still another embodiment of the image pickup device according to the present invention.

Referring now to FIG. 16, there is shown a block diagram of another embodiment of the signal processor of the signals read out from the above-described CCD. The color filter shown in FIG. 2 is adhered on the surface of the image pickup device 10 to be driven by the driver 20 for producing the pulses on the basis of the clock pulses of the clock IC 30, and color signals of R, G and B corresponding to the color separation filter are individually obtained as its output signals S1–S3.

Figure 17:
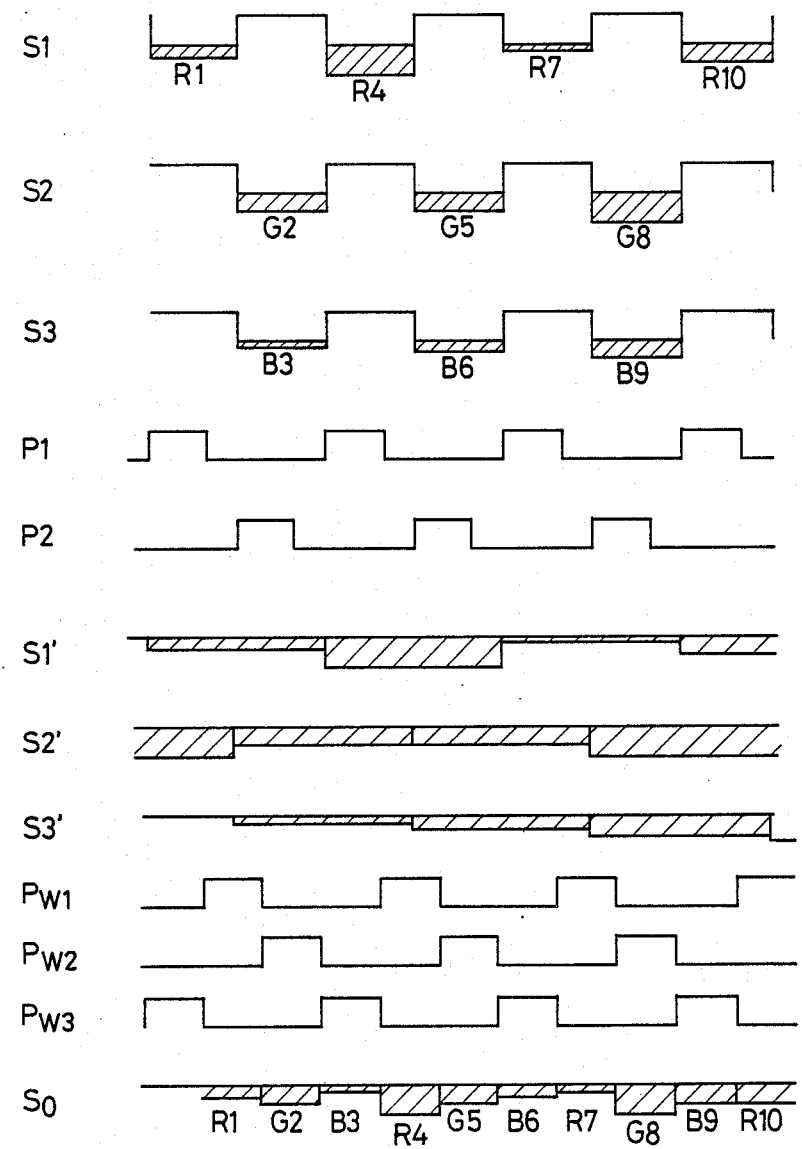
FIG. 17 is a diagram to explain a method of synthesizing a luminance signal by the device shown in FIG. 16.

In this embodiment in this case, the horizontal shift registers SR1, SR2 and SR3 are driven in such a manner that the phase of a drive pulse $\phi_{S1}$ of the SR1 is shifted by 180° from the phases of drive pulses $\phi_{S2}$ and $\phi_{S3}$ of the SR2 and SR3; therefore, their color signals are as shown at S1, S2 and S3 of FIG. 17. In FIG. 17, the hatched sections indicate the valid signal components, respectively. These color signals become the signal waveforms having periodic widths which are close to about 100% of the drive pulse cycles in sample and hold circuits 400 at the next stage. The signal S1 is controlled by a sample and hold pulse P1 and the signals S2 and S3 are controlled by a sample and hold pulse P2, respectively, so that the phase difference between the output signal S1' and the output signals S2' and S3' of the sample and hold circuits 400 is maintained at 180°. Although a dot-sequential signal $S_0$ is produced from these signals in the switching circuit 60 as sequence means by control pulses PW1, PW2 and PW3, it is necessary to allow the phases of the color signals R, G and B which are included in this signal $S_0$ to coincide with the spatial sampling phase of the color separation filter. For this purpose, the timings of the switching pulses PW1, PW2 and PW3 are determined as shown in FIG. 17, namely the pulse PW1 is substantially in the intermediate period of the signal S1', while the pulses PW2 and PW3 are in the signal intervals of the signals S2' and S3'. In this way, by controlling the sample and hold timing and switching timing, the output $S_0$ of the switching circuit 60, which will be the luminance signal, is converted into the dot-sequential signal in which each color signal has a sufficient spatial frequency component as shown in FIG. 17, thereby enabling high resolution to be obtained.

Furthermore, since only the necessary portions such as the luminance signal are extracted and switched, the deterioration of the S/N ratio as in the case of a conventional example does not occur.

In addition, as described before, no noise is mixed with the signal component since the duty ratios of the output signals S1', S2' and S3' of a plurality of registers are 50% and at the same time there is a relationship of positive phase or antiphase between their phases.

Moreover, since at least two output signals of a plurality of registers are mutually in antiphase relation, in case of producing the luminance signal by performing the dot-sequence processing to these registers outputs, it is possible easily to form the wide-band luminance signal in accordance with the spatial sampling phase.

Namely, assuming that all of the outputs of a plurality of registers have the same phase, unless there are delay means as in the embodiment shown in FIG. 13, the luminance signal having the spatial sampling phase as mentioned above will not be able to be formed. However, according to the present invention, it is possible to obtain the wide-band signal by way of the switching pulses PW1–PW3 without using such delay means.

It is of course possible to apply such a method as described above to the case where only two horizontal shift registers are provided or to the cases where four or more horizontal shift registers are provided as well as the case where the three horizontal shift registers are provided. The output signals S1', S2' and S3' of the sample and hold circuits 400 are limited to the component of the signal band of about 1 MHz which is necessary as the color signals by way of low-pass filters 600 at the next stage. Low-pass filter 800 performs a function similar to that of filters 600, although, as will be appreciated by those skilled in the art, filter 800 will have a higher cut-off frequency than do filters 600.

Figure 18:
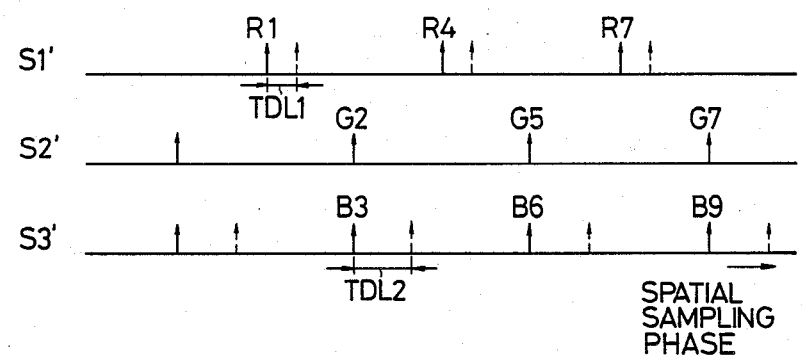
FIG. 18 is a diagram to explain the sampling phases of the color signals in the embodiment shown in FIG. 16.

On the other hand, the spatial sampling phases (at the center of sensitivity) of the signals S1', S2' and S3' are as shown in FIG. 18. In the diagram, the solid line arrows indicate each phase relationship when the sample and hold circuits 400 output, while the broken line arrows represent the ideal phases (positions) which coincide with the spatial sampling phases of the color separation filter. Therefore, the signals S1' and S2' are needed to be adjusted with the delay times of $T_{DL1}$ and $T_{DL2}$ as shown in FIG. 18, respectively. Delay circuits 700 shown in FIG. 16 are provided for this purpose. The luminance signal Y and color signals R, G and B obtained in the manner as described above are introduced to a process encoder circuit 900 consisting of adjusting circuits for gamma correction, white clip and black level, a chroma-modulator, and the like, thereby obtaining the NTSC signal.

Although the output signals of the sample and hold circuits 400 are directly sent to the switching circuit 60 in the above embodiment, by inserting level matching circuits to adjust each signal level at the front stage of the switching circuit as in case of the embodiment of FIG. 11, the fold distortion of the luminance signal can be fairly reduced.

In the case where the drive frequency of the horizontal shift registers is high, the delay circuits 700 can be also omitted. In other words, assuming that the spatial sampling frequency of the color separation filter is for example in the order of 14 MHz, the sampling frequency of each color signal corresponds to about 4.8 MHz and $T_{DL1}=35$ ns and $T_{DL2}=70$ ns in case of the above-mentioned embodiment, so that there will be no problem even if they are neglected in consideration of the color resolution of about 500 kHz–1 MHz of the color signals. In addition, in place of providing the delay circuits 700, it may be possible to equivalently obtain the delay characteristics by slightly changing the cut-off characteristics of the low-pass filters 600.

It is of course possible to provide the delay circuits 700 on the signal paths before the low-pass filters 600.

As described above, by driving at least two horizontal shift registers among a plurality of horizontal shift registers with antiphases, the following effects can be derived.

Firstly, since the leakage noise due to the capacitive coupling of the drive pulses is hardly mixed in the output signals of the horizontal shift registers, no modulation noise occurs due to this noise.

Secondly, when producing the dot-sequential luminance signal by sequentially switching and outputting each register output, the dot-sequence processing can be performed in accordance with the spatial sampling without using delay circuits or the like, this enables the constitution to be simplified.

Thirdly, there is an effect such that the timing accuracy of the sample and hold pulse may be particularly the same as ordinary pulse, and the like.

In addition, since the color signals can be produced from the duties of about 100% of the drive pulse cycles, the low-frequency noise can be reduced. Moreover, the S/N ratio is improved by producing the luminance signal by switching the valid components of each color signal.

What is claimed is:
1. A device comprising:
   (a) a storage part for storing dot signals in a predetermined dot order;
   (b) a plurality of readout parts for reading out the dot signals stored in said storage part, each of said readout parts comprising a register, and said plurality of readout parts and said storage part together constituting at least part of an image pickup device;
   (c) level adjustment means for adjusting the levels of the dot signals read out by said plurality of readout parts according to a white balance control signal; and
   (d) sequence means for converting the level-adjusted dot signals into a dot-sequential signal such that a dot order of the dot-sequential signal is the same as that of the dot signals stored in said storage part.

2. A device according to claim 1, wherein each of said plurality of readout parts is arranged to read out the dot signals stored in a predetermined plurality of portions of said storage part.

3. A device according to claim 1, wherein said plurality of readout parts are arranged to divide dot signals stored in a horizontal line of said storage part into a plurality of groups of dot signals, each of said plurality of readout parts being arranged to read out of said plurality of groups of dot signals.

4. A device according to claim 1, further comprising an image sensing part for supplying said dot signals to said storage part.

5. A device according to claim 4, further including a color filter for color coding light incident upon said image sensing part.

6. A device according to claim 5, wherein said color filter consists of a plurality of color filter portions, each of said plurality of color filter portions having one of a plurality of different colors and corresponding to one of said dot signals.

7. A device according to claim 6, wherein each of said plurality of readout parts is arranged to read out the dot signals corresponding to all of said color filter portions which have a corresponding one of said plurality of different colors.

8. A device according to claim 1, wherein said level adjustment means includes clamp means for clamping the levels of said dot signals to a reference level.

9. A device according to claim 1, further comprising a filter to limit the bandwidth of said dot-sequential signal.

10. A device according to claim 9, further including a processor to produce a luminance signal from said bandwidth-limited dot-sequential signal.

11. A device according to claim 1, wherein said sequence means includes a switching circuit.

12. A device according to claim 1, further including suppression means for nonlinearly suppressing said dot-sequential signal.

13. A device according to claim 1, further comprising delay means for delaying the dot signals read out by at least one of said plurality of readout parts.

14. A device according to claim 1, further comprising suppression means for nonlinearly suppressing said level-adjusted dot signals.

15. A device according to claim 1, further comprising control means for controlling said plurality of readout parts.

16. A device according to claim 15, wherein said control means controls said plurality of readout parts to read out said dot signals such that said dot signals read out by said plurality of readout parts have the same phase.

17. A device according to claim 15, wherein said control means controls said plurality of readout parts to read out said dot signals such that said dot signals read out by said plurality of readout parts have mutually different phases.

18. A device according to claim 15, wherein said control means controls said plurality of readout parts to read out said dot signals such that said dot signals read out by said plurality of readout parts have mutually opposite phases.

19. An apparatus comprising:
(a) a storage unit for storing dot signals in a predetermined order;
(b) a plurality of readout units for dividing and reading out the signals stored in said storge unit, said plurality of readout units and said storage unit together constituting at least part of an image pickup device;
(c) level adjust means for adjusting the levels of the signals read out by said plurality of readout units according to a white balance control signal;
(d) means for suppressing the level-adjusted signals; and
(e) means for selectively supplying said suppressed level-adjusted signals to a common line such that said suppressed level-adjusted signals are supplied in the same order as that of the dot signals stored in said storage unit.

20. An apparatus according to claim 19, wherein each of said plurality of readout units is arranged to read out signals stored in a predetermined number of portions of said storage unit.

21. An apparatus according to claim 19, wherein said said suppressing means suppresses the level-adjusted signals when said level-adjusted signals exceed a predetermined value.

22. An apparatus according to claim 19, further comprising color balance detecting means for detecting a color balance of the signals read out by said plurality of readout units, and means for generating the white balance control signal in accordance with a result of the detection by said color balance detecting means.

23. An apparatus comprising:
(a) a storage unit for storing dot signals in a predetermined order;
(b) readout means for dividing the signals stored in said storage unit and for reading out the divided signals onto a plurality of lines, said readout means and said storage unit together constituting at least part of an image pickup device;
(c) level adjust means for adjusting the levels of the signals read out by said readout means according to a white balance control signal;
(d) means for suppressing the level-adjusted signals; and
(e) means for selectively supplying said suppressed level-adjusted signals to a common line such that said suppressed level-adjusted signals are supplied in the same order as that of the dot signals stored in said storage unit.

24. An apparatus according to claim 23, wherein said readout means includes a plurality of readout units each of which is allowed to read out signals stored in a predetermined plurality of portions of said storage unit.

25. An apparatus according to claim 23, further comprising color balance detecting means for detecting a color balance of the signals read out by said readout means, and means for generating the white balance control signal in accordance with a result of the detection by said color balance detecting means.

26. An apparatus comprising:
(a) a two-dimensional storage unit having a plurality of cells for storing signals;
(b) a plurality of readout units for reading out the signals stored in said storage unit; and
(c) drive means for driving said plurality of readout units in response to a drive signal, said drive means driving a first one of said readout units and a second one of said readout units in response to said drive signal such that the signals read out by said first readout unit and by said second readout unit have mutually opposite phases,
wherein said plurality of readout units includes three readout units, and said drive means drives said first readout unit such that the signals read out by said first readout unit have a first phase and drives said second readout unit and a third one of said three readout units such that the signals read out by said second and third readout unit have a second phase which is opposite to said first phase in response to said drive signal.

27. An apparatus according to claim 26, further comprising level adjust means for adjusting the levels of the signals read out by said plurality of readout units.

28. An apparatus according to claim 26, further comprising process means for processing the signals read out by said plurality of readout units.

29. An apparatus according to claim 28, wherein said process means supplies the signals read out by said plurality of readout units to a common line.

30. An apparatus according to claim 29, wherein said process means selectively supplies the signals read out by said plurality of readout units to a common line.

31. An apparatus comprising:
(a) a storage unit for storing dot signals in a predetermined order;
(b) three readout units for dividing the signals stored in said storage unit into three groups of signals and reading out said three groups of signals onto three lines, said three readout units and said storage unit together constituting at least part of an image pickup device;
(c) drive means for driving said three readout units with three-phase drive signals having mutually different respective phases;
(d) level adjusting means for adjusting the levels of the signals read out by said three readout units according to a white balance control signal; and
(e) means for selectively supplying the level-adjusted signals to a common line such that said level-adjusted signals are supplied in the same order as that of the dot signals stored in said storage unit.

32. An apparatus according to claim 31, wherein said three-phase drive signals have substantially the same frequency.

33. An apparatus according to claim 32, wherein said supplying means supplies the level-adjusted signals to said common line in the same order in which said three readout units are driven.

34. An apparatus comprising:
(a) a storage unit for storing dot signals in a predetermined order;
(b) a plurality of readout units for reading out the signals stored in said storage unit, each of said readout units including a register, said plurality of readout units and said storage unit together constituting at least part of an image pickup device;
(c) level adjusting means for adjusting the levels of the signals read out by said plurality of readout units according to a white balance control signal; and
(d) swtiching means for selectively supplying said level-adjusted signals to a common line such that said level-adjusted signals are supplied in the same order at that of the dot signals stored in said storage unit.

35. An apparatus according to claim 34, wherein said plurality of readout units are arranged to read out the signals stored in a predetermined plurality of portions of said storage unit.

36. An apparatus according to claim 34, further comprising an image sensing unit for supplying image signals to said storage unit as the dot signals.

37. An apparatus according to claim 36, further comprising a color filter for color coding light incident upon said image sensing unit.

38. An apparatus according to claim 37, wherein said color filter consists of a plurality of color filter portions, each of said color filters portions having one of a plurality of different colors and corresponding to one of said image signals.

39. An apparatus according to claim 38, wherein each of said plurality of readouts units is arranged to read out the image signals corresponding to all of said color filter portions which have a corresponding one of said plurality of different colors.

40. An apparatus according to claim 34, wherein said plurality of readout units are charge transfer structures.

41. An apparatus according to claim 34, wherein said level adjusting means includes clamp means for clamping the levels of the signals read out by said plurality of readout units to predetermined reference levels.

42. An apparatus according to claim 34, wherein said plurality of readout units consists of two readout units.

43. An apparatus according to claim 34, further comprising color balance detecting means for detecting a color balance of the signals read out by said plurality of readout units, and means for generating the white balance control signal in accordance with a result of the detection by said color balance detecting means.

44. An image pickup device comprising:
 (a) image pickup means comprising a plurality of registers, wherein said image pickup means converts incident radiation into an electrical image signal and divides said electrical image signal into a plurality of divided signals, and wherein each of said plurality of registers reads out one of said plurality of divided signals;
 (b) level adjust means for adjusting the levels of the plurality of divided signals read out by said plurality of registers according to a white balance control signal; and
 (c) sequence means for converting the level-adjusted signals into a dot-sequential signal so as to restore said electrical image signal.

45. An image pickup device according to claim 44, further comprising clamp means for clamping the plurality of divided signals read out by said plurality of registers to a predetermined level, wherein said level adjust means adjusts the levels of the clamped signals.

46. An image pickup device according to claim 45, wherein said image pickup means further comprises:
 (a) convert means for converting the incident radiation into the electrical image signal;
 (b) storage means for storing the electrical image signal; and
 (c) divide means for dividing the electrical image signal stored in said storage means into the plurality of divided signals.

47. An image pickup device according to claim 44, wherein said image pickup means further comprises:
 (a) convert means for converting the incident radiation into the electrical image signal;
 (b) storage means for storing the electrical image signal; and
 (c) divide means for dividing the electrical image signal stored in said storage means into the plurality of divided signals.

* * * * *

UNITED STATES PATENT AND TRADEMARK OFFICE
CERTIFICATE OF CORRECTION

PATENT NO. : 4,935,808
DATED : June 19, 1990
INVENTOR(S) : SEIJI HASHIMOTO

It is certified that error appears in the above-identified patent and that said Letters Patent is hereby corrected as shown below:

COLUMN 1

Line 45, "numer" should read --number--.

COLUMN 2

Line 58, "samples" should read --sampled--.

COLUMN 3

Line 23, "photographic" should read --photographing--.
Line 42, "difference with" should read
    --variability in--.
Line 43, "path of" should read --path to--.
Lines 44-45, "such difference" should read
    --such variation--.
Line 45, "a" should be deleted and "these" should read
    --of these--.

COLUMN 4

Line 1, "55-51395," should read --Kokoku 55-51395,--.
Line 3, "becomes" should read --become--.
Line 48, "an" should read --and--.

COLUMN 10

Line 36, "registers" should read --register--.

UNITED STATES PATENT AND TRADEMARK OFFICE
CERTIFICATE OF CORRECTION

PATENT NO. : 4,935,808
DATED : June 19, 1990
INVENTOR(S) : SEIJI HASHIMOTO

It is certified that error appears in the above-identified patent and that said Letters Patent is hereby corrected as shown below:

COLUMN 13

Line 24, "said" should be deleted.

COLUMN 14

Line 11, "second and third readout unit" should read
--second and third readout units--.
Line 64, "swtiching means" should read
--switching means--.
Line 67, "at" should read --as--.

Signed and Sealed this

Fifteenth Day of October, 1991

Attest:

HARRY F. MANBECK, JR.

*Attesting Officer*  *Commissioner of Patents and Trademarks*